US012802670B2

(12) United States Patent
Ma et al.

(10) Patent No.: US 12,802,670 B2
(45) Date of Patent: Nov. 17, 2026

(54) DECODING CHORD INFORMATION FROM BRAIN ACTIVITY

(71) Applicant: THE UNIVERSITY OF HONG KONG, Hong Kong (HK)

(72) Inventors: Xin Ma, Hong Kong (HK); Kwan Lawrence Yeung, Hong Kong (HK)

(73) Assignee: VERSITECH LIMITED, Pokfulam (HK)

( * ) Notice: Subject to any disclaimer, the term of this patent is extended or adjusted under 35 U.S.C. 154(b) by 1394 days.

(21) Appl. No.: 17/485,545

(22) Filed: Sep. 27, 2021

(65) Prior Publication Data

US 2022/0130357 A1 Apr. 28, 2022

Related U.S. Application Data

(60) Provisional application No. 63/106,486, filed on Oct. 28, 2020.

(51) Int. Cl.
*G10G 1/04* (2006.01)
*G06N 3/004* (2023.01)

(52) U.S. Cl.
CPC ............... *G10G 1/04* (2013.01); *G06N 3/004* (2013.01)

(58) Field of Classification Search
CPC ................................ G10G 1/04; G06N 3/004
See application file for complete search history.

(56) References Cited

U.S. PATENT DOCUMENTS 8,671,069 B2 3/2014 Chang et al.
9,451,883 B2 9/2016 Gallant et al.

FOREIGN PATENT DOCUMENTS

WO 2014066855 5/2014

OTHER PUBLICATIONS

Klapuri, Anssi. "Introduction to music transcription." Signal processing methods for music transcription. Boston, MA: Springer US, 2006. 3-20. (Year: 2006).*
Lai, Margherita, et al. "A comparison between scalp-and source-reconstructed EEG networks." Scientific reports 8.1 (2018): 12269. (Year: 2018).*
Muhamedyev, Ravil. "Machine learning methods: An overview." Computer modelling & new technologies 19.6 (2015): 14-29. (Year: 2015).*
Schaefer, Rebecca S., et al. "Name that tune: decoding music from the listening brain." neuroimage 56.2 (2011): 843-849. (Year: 2011).*
Yuan, Ye, et al. "A novel channel-aware attention framework for multi-channel eeg seizure detection via multi-view deep learning." 2018 IEEE EMBS international conference on biomedical & health informatics (BHI). IEEE, 2018. (Year: 2018).*
Foster, Chris, et al. "Decoding music in the human brain using EEG data." 2018 IEEE 20th International Workshop on Multimedia Signal Processing (MMSP). IEEE, 2018. (Year: 2018).*
Koelsch, Stefan. "Investigating emotion with music: neuroscientific approaches." Annals of the New York Academy of Sciences 1060.1 (2005): 412-418. (Year: 2005).*
Kolchinsky A, Dhande N, Park K, Ahn YY. The Minor fall, the Major lift: inferring emotional valence of musical chords through lyrics. R Soc Open Sci. Nov. 15, 2017;4(11) (Year: 2017).*
Bakker, David Radford, and Frances Heritage Martin. "Musical chords and emotion: Major and minor triads are processed for emotion." Cognitive, Affective, & Behavioral Neuroscience 15.1 (2015): 15-31. (Year: 2015).*

* cited by examiner

*Primary Examiner* — Larry D Riggs, II
*Assistant Examiner* — Keenan Neil Anderson-Fears
(74) *Attorney, Agent, or Firm* — Amin, Turocy & Watson, LLP

(57) ABSTRACT

Disclosed are systems and methods for decoding chord information from brain activity. General chord decoding protocols involves using computational operations for the extraction of neural codes, the development of the decoding model, and the deployment of the trained model.

12 Claims, 6 Drawing Sheets

Table 1. Comparison with relevant state-of-the-art techniques.

| Ref. | Capable of estimating chord information | Capable of decoding inner musical experience | Topmost accuracy of chord estimation | Topmost accuracy of chord type estimation |
|---|---|---|---|---|
| [5] | No | Yes | <53%[1] | <53%[1] |
| [6] | No | Yes | <67%[1] | <67%[1] |
| [7] | No | Yes | <95%[1] | <95%[1] |
| [8] | No | Yes | N/A[2] | N/A[2] |
| [9] | Yes | No | 80% | N/A[3] |
| [10] | Yes | No | 84% | N/A[3] |
| [11] | Yes | No | 83% | 98% |
| **Our Invention** | Yes | Yes | **93%** | **99%** |

[1] Lower than the accuracy of musical stimuli reconstruction/identification in the best case.

[2] Only qualitative results are available in this study.

[3] Not Reported.

Figure 4

DECODING CHORD INFORMATION FROM BRAIN ACTIVITY

CROSS-REFERENCE TO RELATED APPLICATIONS

This application claims priority to U.S. Provisional Application Ser. No. 63/106,486 filed on Oct. 28, 2020, the entire contents of which are incorporated herein by reference.

TECHNICAL FIELD

Disclosed are systems and methods for decoding chord information from brain activity.

BACKGROUND

A chord is a harmonic group of multiple pitches that sound as if simultaneously. Chords, as well as chord progression which is the sequence of chords, can largely decide the emotional annotations of music, evoke specific subjective feelings and are thus vital for musical perception and most musical creation processes. In the area of music information retrieval, great efforts have been made to achieve better performance in automatic chord estimation (ACE), which is regarded as one of the most important tasks in this area.

Other than extracting the chords from a given piece of music, people may also be interested in the chords of inner music (such as musical memory, musical imagination, musical hallucination, earworm, etc.) in certain circumstances (e.g. recording the chord progression in the process of musical creation, understanding the emotional valence of the inner musical stimulus for healthcare, etc.). In this case, however, since only subjective experiences instead of audio signals of the music are available, conventional ACE-based methods are not helpful.

Neuropsychological studies have revealed that musical perception and imagination share similar neuronal mechanisms and produce similar brain patterns. Several music-relevant studies made efforts to reconstruct the musical stimuli from brain activity in musical listening and musical imagery. When it comes to chord information, however, the above-mentioned stimuli-reconstruction-based techniques can largely limit the accuracy of chord estimation as a result of the poor reconstruction accuracy and additional information loss in the progress of music-to-chord transcription. Thus, a direct estimation of chords from brain activities is desirable.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Currently, there is no available technology to directly decoding chord information from brain activity. One possible way is first using the existing auditory stimuli decoding technology to reconstruct the musical stimuli, and then using automatic chord estimation technology to estimate the chord information from the reconstructed music. But using the existing auditory stimuli decoding technology has severe problems of information loss. And using automatic chord estimation technology also causes secondary information loss.

Reading the chord information from the brain has a wide range of applications in multiple areas such as mental illness healthcare and musical creation. However, no presently available technology can accomplish such a task. Current methods, such as reconstructing musical stimuli, suffer from low accuracy and can easily lose the chord information during the reconstruction process.

These problems are addressed by using deep learning-based methodologies to directly decode chord information from brain activity.

In one aspect, described herein is a system for transcribing, generating and recording chords, comprising a memory that stores functional units and a processor that executes the functional units stored in the memory, wherein the functional units comprise a learning module comprising a functional neuroimaging component to measure the brain activity of a subject during the listening of music labelled with chords, a signal processing component to extract brain activity patterns, a well-defined database of relevant chord labels of music, and a decoding model with a pre-defined architecture for training; and a decoding module comprising a functional neuroimaging component to measure raw brain activity in a wide range of mental musical activities, a signal processing component to extract brain activity patterns suitable for input, a trained decoding model derived from the learning module to convert the input data into chord information, and a data output component configured to output chord information from the trained decoding model.

In another aspect, described herein is a method for decoding chord information from brain activity involving acquiring raw brain activity data from one or more subjects while the one or more subjects are listening to music with music data comprising labels of chords; extracting brain activity patterns from the raw brain activity data; temporally coupling brain activity patterns and music data to form training data for the decoding model; training the decoding model; optionally using unlabeled brain activity to fine-tune the trained decoding model; acquiring a second batch of raw brain activity from subjects via functional neuroimaging in a wide range of mental musical activities; and mapping the second batch of brain activity into corresponding chord information.

In another aspect, described herein is a system for chord decoding protocols, comprising a memory that stores functional units and a processor that executes the functional units stored in the memory, wherein the functional units comprise: a neural code extraction model to generate raw data from at least one of existing musical neuroimaging datasets and offline measurements from users acquired during music listening, and then extract neural codes as processed brain activity patterns from the raw data obtained during music-related mental processes; a decoding model made by an estimation of mapping between the neural codes and chords of inner music; and a trained model to apply the neural codes to obtain an estimation of chord information and perform a fine-tuning operation.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 4 shows Table 1 that reports experimental results of a comparison with relevant state-of-the-art techniques.

DETAILED DESCRIPTION

The subject matter described herein can be easily understood as "brain reading" with an especial focus on decoding chord information during musical listening, musical imagination, or other mental processes. Chord information extraction is conventionally based on music segments per se and has never been achieved through a neuroscience-based computational method before. In this disclosure, a novel method for decoding chord information from brain activity is described. The specific problems the invention solves include but are not limited to 1) In clinical scenarios, the evaluation of symptoms of auditory hallucination conventionally relies on self-reporting systems and thus lacks precision, while the systems and methods described herein can assist the doctors and healthcare workers in forming a better understanding of the nature of inner sounds in musical hallucination (MH) patients and musical ear syndrome (MES) patients to improve the quality of the treatment and healthcare. The above-mentioned intelligent healthcare system for MH and MES patients is considered novel as well. 2) For music fans and creators, manually dealing with chords could be taxing or interrupt the creative process, while the systems and methods described herein can provide a more efficient and more convenient way to transcribe, generate and record chords and chord progressions from their subjective perceptual or cognitive experiences with no need of the participation of their motor functions (e.g. singing, speaking or writing). The above-mentioned intelligent system for transcribing, generating and recording chords is considered novel as well.

The human brain has evolved the computational mechanism to translate musical stimuli into high-level information such as chords. Even for subjects without musical training, important chord information such as chord quality (i.e. chord type) can still be perceived and thus embedded in their brain activity, with or without awareness. In this disclosure, a novel method for decoding chord information from brain activity is described. Aspects of the method include acquiring and processing brain activity data from subjects or users, using labelled brain activity and music data to train a decoding model, using unlabeled brain activity to fine-tune the trained decoding model, and mapping brain activity into corresponding chord information.

Figure 1:
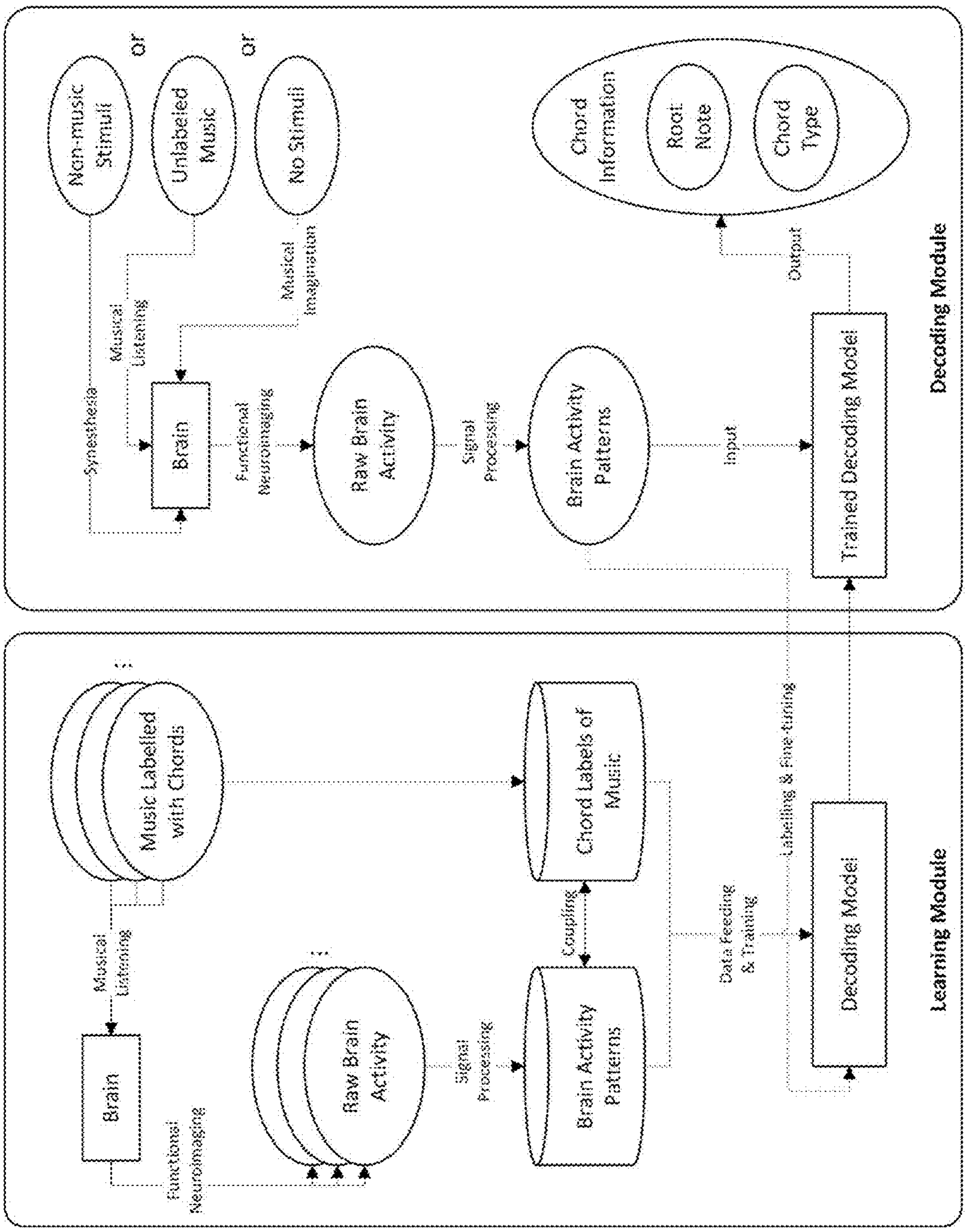
FIG. 1 depicts a schematic diagram of a pipeline of decoding chord information from brain activity in accordance with an aspect of the subject matter herein.

Referring to FIG. 1, shown is the general pipeline of the systems and methods described herein. It is composed of a learning module and a decoding module. The general steps/acts are as follows. In every instance, it is not necessary to perform each step/act. The aspects and objectives described herein can be achieved by performing a subset of the steps/acts that follow.

One step/act is to acquire the raw brain activity from the subjects through functional neuroimaging when they are listening to music with labels of chords. The raw brain activity here refers to the measurements of brain activity using any kind of functional neuroimaging techniques, which may include but is not necessarily limited to functional magnetic resonance imaging (fMRI), functional near-infrared spectroscopy (fNIRS), Electroencephalography (EEG), Magnetoencephalography (MEG), functional ultrasound imaging (fUS), and positron emission tomography (PET). In circumstances where invasive recording is available, Electrocorticography (ECoG) and intracortical recordings (ICoR) are also included.

Another step/act is to process the raw brain activity and extract brain activity patterns. The processing of the raw brain activity may vary across different neuroimaging modalities, but it should generally contain the steps of preprocessing, regions-of-interest (ROIs) definition and brain activity pattern extraction. In the case where voxel-wise analysis is more suitable, the definition of the ROIs should be all the voxels. For 3-dimensional data (e.g. fMRI data), raw data are encoded with spatial information. For 2-dimensional data (e.g. EEG/MEG data), raw data are encoded with channel information and source reconstruction is recommended to be performed before feeding the data to the learning and decoding module. The nature of the brain activity patterns may vary across different temporal resolutions of different neuroimaging modalities. For data with low temporal resolution (e.g. fMRI data), spatial patterns (i.e. brain activity distribution across the ROIs) are recommended. For data with high temporal resolution (e.g. EEG/MEG data), spatiotemporal patterns are recommended.

Another step/act is to pass the brain activity patterns and chord labels to the decoding model. The chord labels and the brain activity patterns are temporally coupling with each other. The decoding model is a deep neural network (or any other types of computational models serving for the same purpose, e.g. support vector machine or other machine learning models), while its architecture can vary from a large range, which may include but is not limited to dense neural networks, spatial or spatiotemporal convolutional neural networks (CNNs) and recurrent neural networks (RNNs). Generally, when spatial patterns are applied, a dense neural network is recommended. The decoding model takes the brain activity patterns as inputs and chord labels as outputs.

Another step/act is to train the decoding model until convergence. The hyperparameters of the model should be adjusted through cross-validation.

Another step/act is to save the trained model and load it to the decoding module.

Another step/act is to, if required by the decoding module, fine-tune the decoding model using the data from the decoding module after manually labelling them and go back to the saving step/act.

Another step/act is to acquire the raw brain activity from the users through functional neuroimaging in a wide range of mental activities such as musical listening, musical hallucination, musical imagination or synesthesia (e.g. visual imagination which is possible to evoke musical experience). When the nature of the data acquired is different from the one in the first step, require the learning module to fine-tune the decoding model.

Yet another step/act is to process the raw brain activity and extract brain activity patterns, the same with the step/act of processing the raw brain activity and extract brain activity patterns.

And another step/act is to pass the brain activity patterns to the decoding model and output the chord information. Depending on specific tasks, the outputs should at least include the root note and the chord type; when slash chords are considered, the bass note should also be included. After, the decoded chord information can be passed and utilized in specific application scenarios such as healthcare or musical creation.

The general apparatus for chord decoding comprises a computer or any other type of programming executable processor which is capable of performing all the data inputting, processing and outputting steps of the method.

Described herein are systems and methods to directly decode chord information from brain activity instead of music. The systems and methods described herein overcome the limitation of traditional ACE methods in dealing with inner music and can improve the quality of specific healthcare, musical creation and beyond.

EXAMPLE

The invention can be understood through an operative embodiment. In terms of results, the accuracy for the top 3 subjects reached 98.5%, 97.9% and 96.8% in the chord type decoding task and 93.0%, 88.7% and 84.5% in the chord decoding task. Since natural music was used in this experiment, these results revealed that the method is accurate and robust to fluctuations of non-chord factors.

Original use of the dataset. The dataset used in this example is from a previous study [SAARI, Pasi, et al. Decoding musical training from dynamic processing of musical features in the brain. Scientific reports, 2018, 8.1: 1-12.]. The major purpose of the previous study is to differentiate if a subject is musically trained or untrained solely from his/her fMRI signals during music listening. Musical stimuli and fMRI signals are provided in the previous study.

Chord Labelling. Music-to-chord transcription is one of the basic training for musicians. We manually labelled the chords of the musical stimuli with the help of a professional musician to acquire the chord information.

Steps:

First, fMRI data were recorded using a 3T scanner from 36 subjects including 18 musicians and 18 non-musicians while they were listening to musical stimuli, where 80% and 10% of the data were used for training, cross-validation in the learning module, 10% were used for testing in the decoding module and only major triad and minor triad were considered.

Second, the recorded fMRI data were realigned, spatially normalized, artifact-minimized and detrended using Statistical Parametric Mapping Toolbox. Automated Anatomical Labeling 116 (AAL-116) was used for ROIs definition. Averaging of all signals within each subarea at each time point was applied to generate the spatial patterns.

Figure 2:
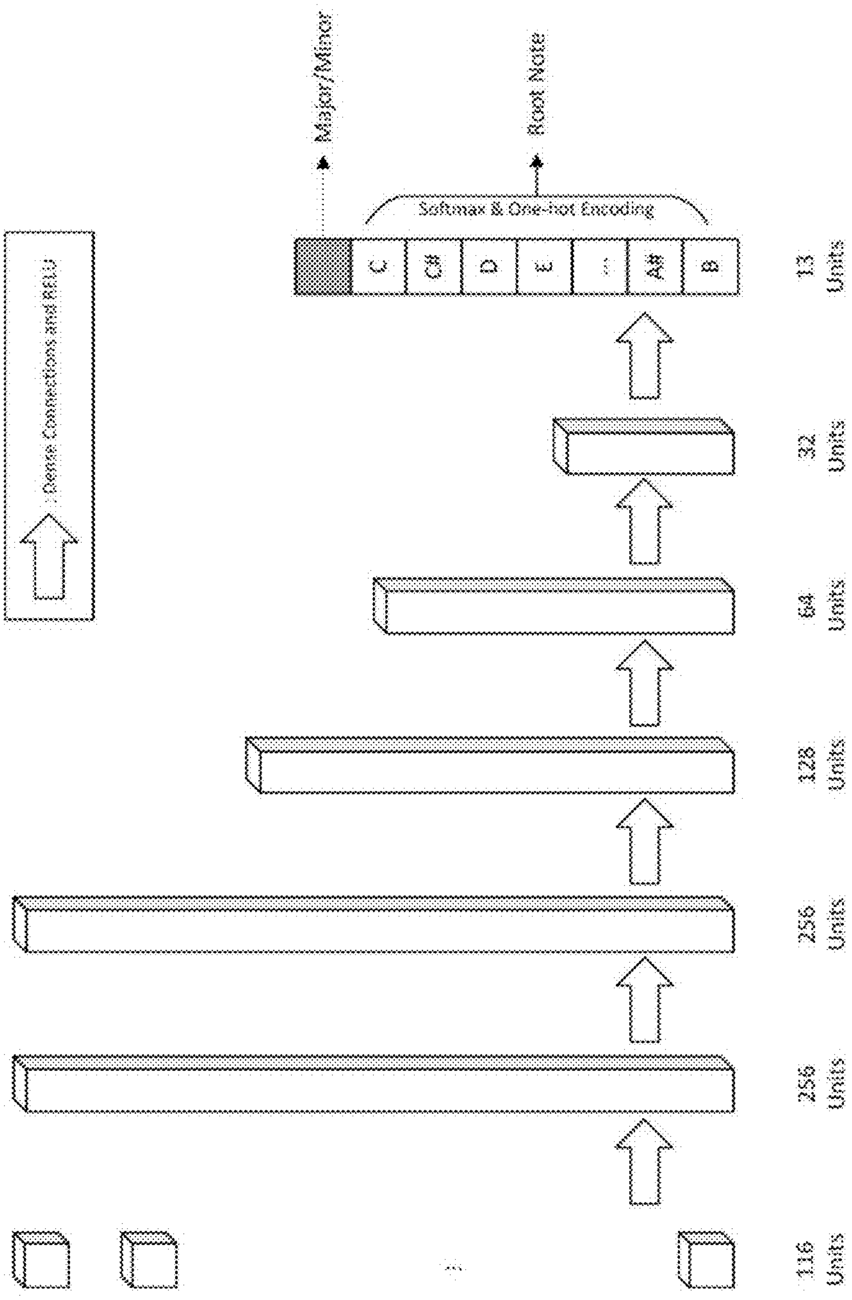
FIG. 2 depicts an embodiment of an example of the architecture of the decoding model.

Third, the brain activity patterns and chord labels were passed to the decoding model. FIG. 2 shows the example of the architecture of the decoding model. It was a dense neural network with 5 hidden layers. The spatial distribution from 116 ROIs were taken as inputs. The output layer was composed of 13 units. The first unit indicated the chord type (0 for minor chord and 1 for major chord). For the other 12 units, softmax and one-hot encoding were applied and each of these units indicated a root note, namely C, C#, D, D#, E, F, F#, G, G#, A, A# and B.

Fourth, the decoding model was trained until convergence. Stochastic gradient descent algorithm was used for optimization and dropout regularization were applied.

Fifth, the trained model was saved and loaded to the decoding module.

Sixth, skip this step since the natures of data in the learning and decoding modules were the same and no fine-tuning was needed.

Seventh to ninth, the testing data were processed using the same method with in the second step and then passed to the trained decoding model. The chord information was outputted.

Mathematical Description of General Chord Decoding Protocols

The following basic notations are employed:

$f_e$ Neural code extraction model
$M_\alpha$ Raw brain activity measurements (for model training)
$X_\alpha$ Neural codes (for model training)
$Y_\alpha$ Chord labels (for model training)
$\hat{Y}_\alpha$ Chord labels (for model training)
$L_\alpha$ Training loss
$M_\beta$ Raw brain activity measurements (for model validation)
$X_\alpha$ Neural codes (for model validation)
$Y_\beta$ Chord labels (for model validation)
$\hat{Y}_\beta$ Estimated chord information (for model validation)
$L_\beta$ Validation loss
$f_d$ Decoding model
M Raw brain activity measurements (for application)
X Neural codes (for application)
Y Chord labels (for application)
$\hat{Y}$ Estimated chord information (for application).

In one embodiment, the procedure involves three major computational operations:

(1) the extraction of neural codes,
(2) the development of the decoding model, and
(3) the deployment of the trained model (i.e. the estimation of chords).

Figure 3:
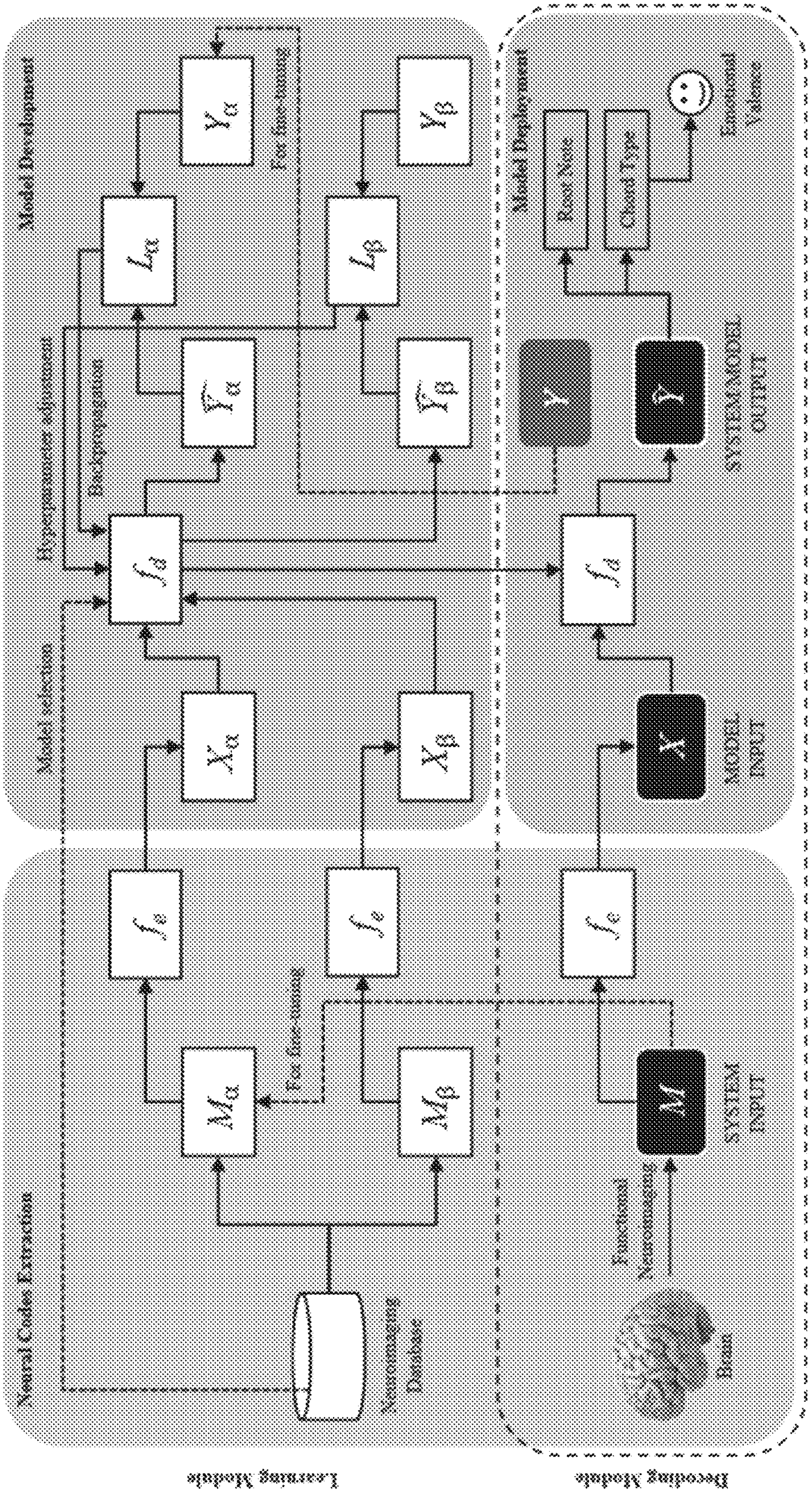
FIG. 3 depicts an embodiment of a flowchart of the computational process in the learning and decoding modules.

The flowchart of the three-part computational process in the learning and decoding modules is demonstrated and illustrated in FIG. 3. Details of FIG. 3 is further explained in the following sections.

1) Extraction of Neural Codes

Raw Functional Neuroimaging Measurements

The raw online functional neuroimaging measurements during a specific time point t from a specific spatial position s of the signal source are denoted as M(t, s). Note that for different neuroimaging modalities, s can be in different formats. For example, for EEG/MEG, s refers to the electrode/channel number n or the 2-dimensional scalp coordinate values {x, y}, while for EEG/MEG with source reconstruction or fMRI, s refers to the 3-dimensional spatial coordinate values of the voxels {x, y, z}.

For model training and validation, the raw data is sourced from existing musical neuroimaging datasets and/or offline measurements from the users (i.e. the neuroimaging database) acquired during music listening, where the latter is recommended to be used for the fine-tuning of the model developed based on the former. Chord labels of the music used in these listening tasks are acquired and associated with their corresponding brain activity measurements. In the holdout validation setting, in one embodiment, these data (raw brain activity measurements with chord labels) are randomly split into training data $\{M_\alpha, Y_\alpha\}$ and validation data $\{M_\beta, Y_\beta\}$ with a ratio of $|M_\alpha|:|M_\beta|=r:1$ (normally r=8, where |A| refers to the number of elements in set A). In another embodiment (in the cross-validation setting), these data will be randomly split into r+1 subgroups. The learning can be repeated for r+1 times. In every repetition, each subgroup is used for validation, and the other r subgroups are used for training.

General Format of Neural Codes

The term neural codes (x) herein refers to the processed brain activity patterns/features extracted from the raw functional neuroimaging measurements M during music-related mental processes (e.g. musical listening, imagination, hallucination), which are the real inputs of the decoding model. The neural code extraction model $f_e$ is an empirical deterministic function that maps M to X through a series of signal processing operations, which can be done with standard neuroimaging processing tools (e.g. Statistical Parametric Mapping Toolbox, EEGLAB, FieldTrip Toolbox). The specific form of $f_e$ varies across different neuroimaging modalities. In principle, $f_e$ includes the preprocessing (e.g. filtering, normalization, artefacts removal, corrections) and the spatially averaging of the signals over each region of interest (ROI). Source reconstruction of channel-based neuroimaging data is optional but usually practiced. The general aim of applying $f_e$ to M is to improve the quality of the brain activity signals and enhance their coupling with the chord information. When directly using the raw measurements as features of interest (i.e. X=M), $f_e$ degrades into an identical mapping $f_I$: A→A. At each time point, the element in the input x is a distribution of activation values across all the ROIs in the brain (for example, for a 116-ROI study, at each time point, the input has the form of a vector $\{x_1, x_2, \ldots, x_{116}\}$).

For the training and validation data $M_\alpha$ and $M_\beta$, $N_\alpha$ and $N_\beta$ can be acquired in accordance to $X_\alpha=f_e(M_\alpha)$, $X_\beta=f_e(M_\beta)$. In one embodiment, note that $M_\alpha$ and $M_\beta$ are recommended to be the data acquired during musical listening (instead of musical imagination, musical hallucination or synesthesia) to ensure the controllability of the chord labels V.

2) Development of the Decoding Model

Description of the Chord Decoding Problem

The chord decoding problem refers to the estimation of the mapping between the neural codes X and the chords of inner music Y, i.e. generating a decoding model $f_d$ from X and Y.

Y is the output of the decoding model; each element in the output Y includes the root note and the chord type, where the latter carries the information about emotional valence; each sample in Y is expressed as a one-hot encoding representation (for example, when considering 48 major, minor, diminished and augmented triads, a "C minor" chord can be represented as $$[\underbrace{0\ 1\ 0\ 0}_{chord\ type}\underbrace{1\ 0\ 0\ 0\ 0\ 0\ 0\ 0\ 0\ 0\ 0\ 0}_{root\ note}];$$

if the chord type considered is binary, e.g. major/minor, the chord type representation can be further compressed into one binary bit).

In one embodiment, note that the proposed method as described herein requires no reconstruction of the musical segments.

Learning Model Selection

Depending on the nature of neuroimaging modalities and the availability of computational resources, different computational models can be applied, including but not limited to dense neural networks, spatial convolutional neural networks (spatial CNNs), spatiotemporal convolutional neural networks (spatiotemporal CNNs) and recurrent neural networks (RNNs).

Generally, a dense neural network is employed when each sample represents a single temporal data point with a distribution of activation values across all the ROIs in the brain (though other vehicles can be employed). For each hidden layer, the node value $$x_1^{[k+1]} = g\left(\sum\nolimits_i w_{i,j}^{[k]} x_i^{[k]} + b\right),$$

where g(·) is the activation function, $$x_i^{[k]}$$

is the ith node in the layer $$k,\ x_j^{[k+1]}$$

is the jth node in the layer $$k+1,\ w_{i,j}^{k}$$

is the corresponding weight, b is the bias. Normally, the rectified linear unit is used as the activation function, i.e.

$$g(x) = ReLU(x) = \begin{cases} 0, & x < 0 \\ x, & x \geq 0 \end{cases}.$$

After these lavers there should be a softmax layer $$p_{(root)\,i} = \frac{e^{z_{(root)\,i}}}{\sum_k e^{z_{(root)\,k}}},\ p_{(type)\,i} = \frac{e^{z_{(type)\,i}}}{\sum_k e^{z_{(type)\,k}}},$$

where $z_{(root,type)i}$ is the ith in the last layer. By taking the spatial information of the ROIs into consideration, a spatial CNN is also typically employed for this data structure and has good performance as well.

For the data structure where each sample represents a series of temporal data points, spatiotemporal CNNs and RNNs can be used and additional temporal information can be provided and exploited. However, such a data structure can cause the problem of difficult temporal grouping/segmentation (i.e. the issue that one sample could cover more than one chord), and are thus not recommended unless special care is taken for this issue.

Decoding Accuracy and Loss Function

The decoding accuracy is defined as $$\frac{t_F}{t_T + t_F},$$

where $t_T$ refers to the total duration of correct estimations and t refers to the total duration of false estimations. The cross-entropy loss for training and validation satisfies $L_{\alpha,\beta}=-\Sigma_i[(y_{\alpha,\beta(root)})_i \cdot \log(\widehat{p_{\alpha,\beta(root)}})_i+(y_{\alpha,\beta(type)})_i \cdot \log(\widehat{p_{\alpha,\beta(type)}})_i]$, where $(y_{(root)})_i$ is the ith value of the root note label, $(\widehat{p_{(root)}})_i$ is the ith value of the softmax output for the root note label, $(y_{(type)})_i$ is the ith value of the chord type label, $(\widehat{p_{(type)}})_i$ is the ith value of the softmax output for the chord type label. For healthcare applications, it is possible that only the chord type is of interest, where $$L_{\alpha,\beta}=-\Sigma_1[(y_{\alpha,\beta(type)})_i \cdot \log(\widehat{p_{\alpha,\beta(type)}})_i.$$

Training (Fitting) and Validation

In the training phase, the parameters of the decoding model $f_d$ is first randomly initialized and then updated via backpropagation. Multiple backpropagation algorithms are available (e.g. stochastic gradient descent, Adam) and can be easily implemented with standard deep learning packages. Dropout regularization can be optionally applied to avoid overfitting.

Cross-validation or holdout validation can be carried out to further adjust the hyperparameters (e.g. model architecture, learning rate) of $f_d$.

3) Deployment of the Trained Model

Inference (Decoding)

The trained model $f_d$ can be then applied to the users' neural codes X to get the estimation of the chord information $\hat{Y}=f_d(X)$. The chord decoding problem defined in the Description of the Chord Decoding Problem section is thus solved.

Fine-Tuning

When the neuroimaging measurements from the user are highly heterogonous from those data on which the decoding model is trained, the decoding module sends an instruction to the learning module to conduct the operation of fine-tuning. The parameters of the lower layers of the model are fixed, and normal training procedures are conducted to adjust the parameters of the higher layers. In this case, manual labelling of a small number of chords (i.e. Y) is required.

RESULTS AND DISCUSSION

Performance of the Example Decoding Model

Leave-one-out cross-validations were performed for each subject to evaluate the cross-subject. The Top-1 accuracy for the top 3 subjects reached 98.5%, 97.9% 96.8% in the chord type decoding task and 93.0%, 88.7% and 84.5% in the chord decoding task. Overall Top-1 accuracy of 88.8% (90.8% for musicians and 86.7% for non-musicians, both were significantly higher than the chance level) was found in the chord type decoding task. Overall Top-3 accuracy of 80.9% (95.7% for musicians and 66.1% for non-musicians, both were significantly higher than the chance level) and overall Top-1 accuracy of 48.8% (66.5% for musicians and 31.1% for non-musicians, both were significantly higher than the chance level) were found in the chord decoding task. These results confirm that enough information has been encoded in the brain activity to decode the chord information. Besides, since natural music was used in this experiment, these results also indicate that the method is accurate and robust to fluctuations of non-chord factors.

Comparison with Relevant State-of-the-Art Techniques

Although there are no currently available techniques for directly decoding chord information from neural activities, several studies have done similar works by trying to reconstruct the musical stimuli or identify the musical stimuli from a known pool of music segments from the brain. Once the stimuli are reconstructed or identified, ACE can then be conducted to estimate the chord information. The accuracy of chord information estimation is inevitably lower than the accuracy of music reconstruction, since the chord information is estimated based on the reconstructed music. A comparison with current techniques is summarized below (Table 1) in FIG. 4.

Novelty and Significance

This describes decoding chord information from brain activity instead of music. It overcomes the limitation of traditional ACE methods in dealing with inner music and can improve the quality of specific healthcare, musical creation and beyond.

APPLICATIONS

This invention could serve as a brain-computer interface (BCI) or provide decoding services for BCIs. The Potential Product and Applications of this invention include many categories:

- intelligent healthcare system for musical hallucination patients and musical ear syndrome patients;
- imagination-based chord progression generation system for music creators;
- automatic chord labelling system for professional musicians; and
- entertainment product to translate users' brain activities into corresponding chords which they are subjectively experiencing.

There are numerous applications in healthcare. For example, to address musical ear syndrome. Musical ear syndrome (MES) is described as a non-psychiatric condition characterized by the perception of music in the absence of external acoustic stimuli. It is reported to affect around 5% of the population. It can affect people of all ages, with normal hearing, with tinnitus, or with hearing loss. Treatment for MES largely depends on an individual basis due to its unknown nature. In some cases, medication can help with the symptoms, but the evidence supporting the prescription of medication for MES is limited. Other treatments for MES may include self-reassurance such as meditation and distraction.

According to various case reports, the experiences of MES patients can be significantly different. Some patients are not bothered, even find it occasionally enjoyable and interesting, while others find it extremely annoying or intolerable. Such different experiences can be caused by the different emotional annotations of their inner music, which largely depends on the chord types. These effects may not be real-time but emerge days or weeks later after the first inner sound appears, which means early-stage control and prevention is possible. Moreover, currently, the understanding toward such effects on patients heavily relies on self-reporting.

This invention can provide an intelligent healthcare system for MES patients, which helps to objectively identify the chord types of their inner sounds which hold the information of emotional valence to provide them better healthcare and treatment (e.g. anti-depression therapies for patients with frequent inner minor chords) before severe symptoms emerge.

Another healthcare example is musical hallucination. Musical hallucination (MH) is a psychopathological disorder where music is perceived without a source, which accounts for a significant portion of auditory hallucination. It comprises approximately 0.16% of the general hospitalization. In elderly subjects with audiological complaints, the prevalence of musical hallucinations was 2.5%. There is no definitive treatment for MH patients. Current treatment is aimed to treat the underlying cause if it is known, such as psychiatric disorders, brain lesions etc. In healthcare, understanding the symptom and its severity of the patients is necessary.

Similar to MES, inner music with different natures may cause different effects on disease progression. In addition, since MH is psychiatric, some patients may not be able to properly communicate and describe the nature of their inner sounds. This invention can provide an intelligent healthcare system for MH patients, which helps to better understand the emotional valence of their inner sounds to provide them better healthcare and treatment before further disease progression.

Another healthcare example is earworm. Earworm, which refers to the involuntary imagery of the music, is common in the general population. It is a common phenomenon experienced by more than 90% of people at least once a week. Earworm should be differentiated from MH, where patients believe the source of the sound is external.

Earworm is normally harmless, but frequent and persistent exposures to music with some specific chords may disturb people, alter their quality of life, and even possibly lead to mental disorders. Besides, people with earworms may be interested in outputting the chord progression for entertainment purposes. This invention may allow people to monitor the chords of their earworms and better understand their emotional valence to keep mental health and prevent possible undesirable outcomes. This invention may also allow people to better understand their earworms by outputting their chord progression for the purpose of entertainment.

There are numerous applications in musical creation. For example, there are applications for inner chord recording. Creating chord progression is a crucial step for most musical creation. Traditional methods for recording the chord may include writing down, or humming out the melody or chord progression. However, recoding actions may normally interfere with the follow-up process of creation. In addition, there are some creators who have no problem with appreciating, imagining and creating music but are unable to accurately sing it out.

This invention may provide musical creators with a new way for creation (including retrieval of chord progressions from memory) by just imagining the chord progression inside their mind without interrupting their creating process.

Another musical creation example is automatic chord transcription (for professional musicians). Chord transcription can be a taxing job. As a result of the high time and labor costs, the price of hiring a professional musician to label is also correspondingly high.

For trained musicians, this invention may provide them with a new automatic way of chord transcription by just paying attention to the chords of the music without the participation of their motor system (e.g. writing, singing). The non-musicians can also benefit because their costs of hiring a professional musician to do the work may go down since fewer efforts are required with our invention.

Another musical creation example is synesthesia-based chord generation. A number of musical creators are struggling with coming up with proper chord progressions for specific topics. For example, writing a chord progression about glaciers. There are some applications for generating chord progressions such as Autochords and ChordChord. However, chord progressions generated by these applications are normally random or based on existing chord progressions, thus are either a cliché or irrelevant to the given topic.

This invention may provide the musical creators with a function to translating experiences with other sensory modalities (e.g. vision) into chord progression with similarity in the sense of subjective experiences. For example, passing the brain activity while seeing a glacier to the trained model and get the corresponding chords. They may use the generated chords for direct creation or as a source of inspiration.

EXAMPLE COMPUTING ENVIRONMENT

Figure 5:
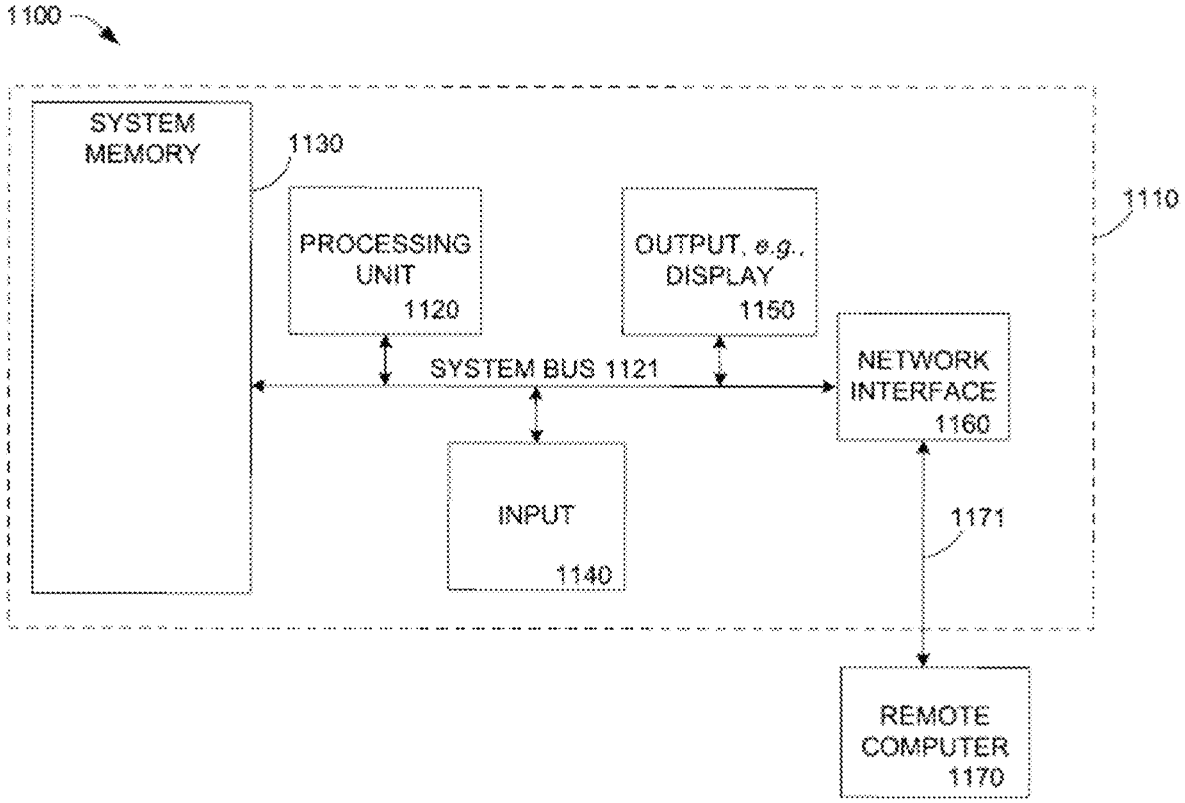
FIG. 5 illustrates a block diagram of an example electronic computing environment that can be implemented in conjunction with one or more aspects described herein.

As mentioned, advantageously, the techniques described herein can be applied to any device and/or network where analysis of data is performed. The below general purpose remote computer described below in FIG. 5 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 5 thus illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing environment 1100 be interpreted as having any dependency or requirement relating to any one or combination of components illustrated in the exemplary operating environment 1100.

With reference to FIG. 5, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, may be stored in memory 1130. Memory 1130 typically also contains data and/or program modules that are immediately accessible to and/or presently being operated on by processing unit 1120. By way of example, and not limitation, memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from device 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 5 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface 1160 or adapter. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of input 1140, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

EXAMPLE NETWORKING ENVIRONMENT

Figure 6:
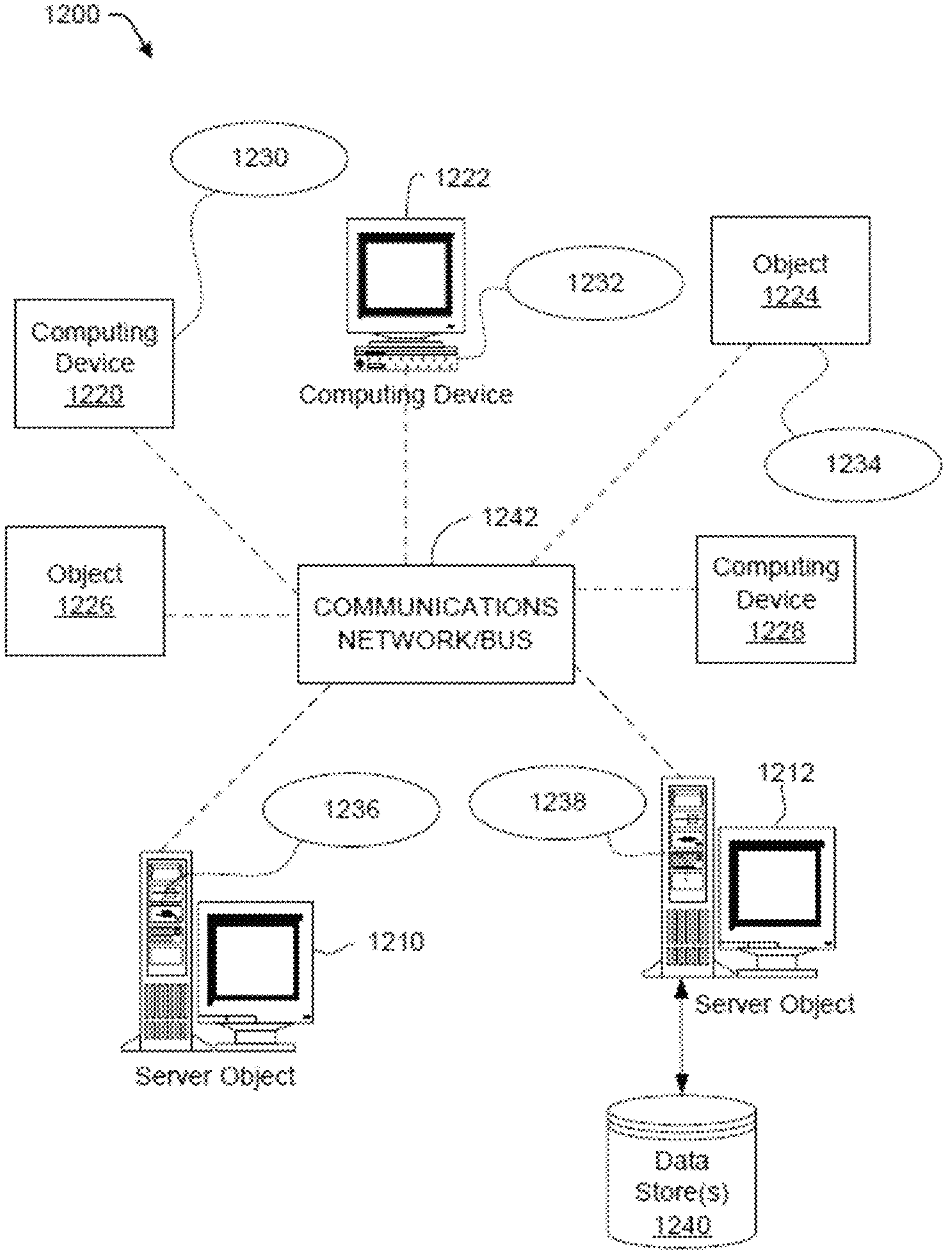
FIG. 6 depicts a block diagram of an example data communication network that can be operable in conjunction with various aspects described herein.

FIG. 6 provides a schematic diagram of an exemplary networked or distributed computing environment 1200. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 can include one or more cache memories, one or more registers, or other similar data stores disclosed herein.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 6, communications network 1242 may comprise other computing objects and computing devices that provide services to the system of FIG. 6, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP) or HTTPS. Computing objects 1210, 1212, etc. acting as servers may also serve as clients, e.g., computing objects or devices 1220, 1222, 1224, 1226, 1228, etc., as may be characteristic of a distributed computing environment.

Reference throughout this specification to "one embodiment," "an embodiment," "an example," "an implementation," "a disclosed aspect," or "an aspect" means that a particular feature, structure, or characteristic described in connection with the embodiment, implementation, or aspect is included in at least one embodiment, implementation, or aspect of the present disclosure. Thus, the appearances of the phrase "in one embodiment," "in one example," "in one aspect," "in an implementation," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

Unless otherwise indicated in the examples and elsewhere in the specification and claims, all parts and percentages are by weight, all temperatures are in degrees Centigrade, and pressure is at or near atmospheric pressure.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A system for transcribing, generating and recording chords, comprising:
- a memory that stores functional units and a processor that executes the functional units stored in the memory, wherein execution of the functional units causes the system to perform operations, the operations comprising:
  - measuring, using a functional neuroimaging technique, raw brain activity data representing brain activity of a subject while the subject is listening to music comprising music data labeled with chord labels;
  - extracting first brain activity data representing first brain activity patterns based on analysis of the raw brain activity data, wherein the extracting comprises:
    - in response to determining that the raw brain activity data is three-dimensional data, encoding the raw brain activity data using spatial information and representing properties of the first brain activity patterns using a spatial pattern, and
    - in response to determining that the raw brain activity data is two-dimensional data, encoding the raw brain activity data using channel information and representing the properties of the first brain activity patterns using a spatiotemporal pattern;
  - determining a correspondence between the first brain activity patterns and the chord labels;
  - temporally coupling the first brain activity patterns encoded in the first brain activity data with the music data based on the correspondence to yield training data;
  - training a decoding model using the training data;
  - measuring second brain activity during mental musical activities;
  - receiving second brain activity pattern data representing second brain activity patterns; and
  - outputting, based on analysis of the second brain activity pattern data using the decoding model, chord information that includes a root note and a chord type, wherein the chord type corresponds to an emotional valence.

2. The system of claim 1, wherein the functional neuroimaging technique comprises one or more of functional magnetic resonance imaging, functional near-infrared spectroscopy, functional ultrasound imaging, electroencephalography, electrocorticography, intracortical recordings, magnetoencephalography, or positron emission tomography.

3. The system of claim 1, wherein the decoding model comprises one or more of a computational model, a deep learning model, a deep neural network, a dense neural network, a spatial convolutional neural network, a spatiotemporal convolutional neural network, a recurrent neural network, a machine learning model, or a support vector machine.

4. A method for decoding chord information from brain activity, comprising:
- acquiring, by a system comprising a processor via functional neuroimaging technology, raw brain activity data from one or more subjects while the one or more subjects are listening to music with music data comprising labels of chords;
- extracting, by the system, first brain activity data representing first brain activity patterns from the raw brain activity data, wherein the extracting comprises:
  - in response to determining that the raw brain activity data is three-dimensional data, encoding the raw brain activity data using spatial information and representing properties of the first brain activity patterns using the spatial pattern, and
  - in response to determining that the raw brain activity data is two-dimensional data, encoding the raw brain activity data using channel information and representing the properties of the first brain activity patterns using a spatiotemporal pattern;
- determining, by the system, a correspondence between the first brain activity patterns and the labels of the chords;
- temporally coupling, by the system, the first brain activity pattern and the music data based on the correspondence to form training data;
- training, by the system, a decoding model using the training data;
- inputting, by the system to the decoding model, second brain activity pattern data representing second brain activity patterns; and
- outputting, by the system based on analysis of the second brain activity pattern data using the decoding model, chord information that includes a root note and a chord type, wherein the chord type is indicative of an emotional valence.

5. The method of claim 4, wherein the acquiring of the raw brain activity data comprises using at least one of functional magnetic resonance imaging, functional near-infrared spectroscopy, functional ultrasound imaging, electroencephalography, electrocorticography, intracortical recordings, magnetoencephalography, or positron emission tomography.

6. The method of claim 4, wherein the acquiring of the raw brain activity data is performed while the one or more subjects are listening to natural music.

7. The method of claim 4, wherein the acquiring of the raw brain activity data is performed while one or more subjects are listening to synthetic music.

8. The method of claim 4, further comprising:

encoding, by the system, the raw brain activity data with channel information; and performing, by the system, source reconstruction on the first brain activity data.

9. The method of claim 4, wherein the decoding model comprises one or more of a computational model, a deep learning model, a deep neural network, a dense neural network, a spatial convolutional neural network, a spatiotemporal convolutional neural network, a recurrent neural network, a machine learning model, or a support vector machine.

10. The method of claim 4, wherein the mental musical activities comprise one or more of musical listening, musical hallucination, musical imagination, or synesthesia.

11. A non-transitory computer-readable medium having stored thereon executable components that, in response to execution, cause a system comprising a processor to perform operations, the operations comprising:

acquiring, via functional neuroimaging technology, raw brain activity data from one or more subjects while the one or more subjects are listening to music with music data comprising labels of chords;

extracting first brain activity data representing first brain activity patterns from the raw brain activity data, wherein the extracting comprises:

in response to determining that the raw brain activity data is three-dimensional data, encoding the raw brain activity data using spatial information and representing properties of the first brain activity patterns using the spatial pattern, and in response to determining that the raw brain activity data is two-dimensional data, encoding the raw brain activity data using channel information and representing the properties of the first brain activity patterns using a spatiotemporal pattern;

determining a correspondence between the first brain activity patterns and the labels of the chords;

temporally coupling the first brain activity pattern and the music data based on the correspondence to form training data;

training a decoding model using the training data;

inputting, to the decoding model, second brain activity pattern data representing second brain activity patterns; and outputting, based on analysis of the second brain activity pattern data using the decoding model, chord information that includes a root note and a chord type, wherein the chord type corresponds to an emotional valence.

12. The system of claim 11, wherein the decoding model comprises one or more of a computational model, a deep learning model, a deep neural network, a dense neural network, a spatial convolutional neural network, a spatiotemporal convolutional neural network, a recurrent neural network, a machine learning model, or a support vector machine.

* * * * *